Aug. 8, 1933.  E. F. BATTERMAN ET AL  1,921,721
CLAMP
Filed Feb. 5, 1931   3 Sheets-Sheet 1
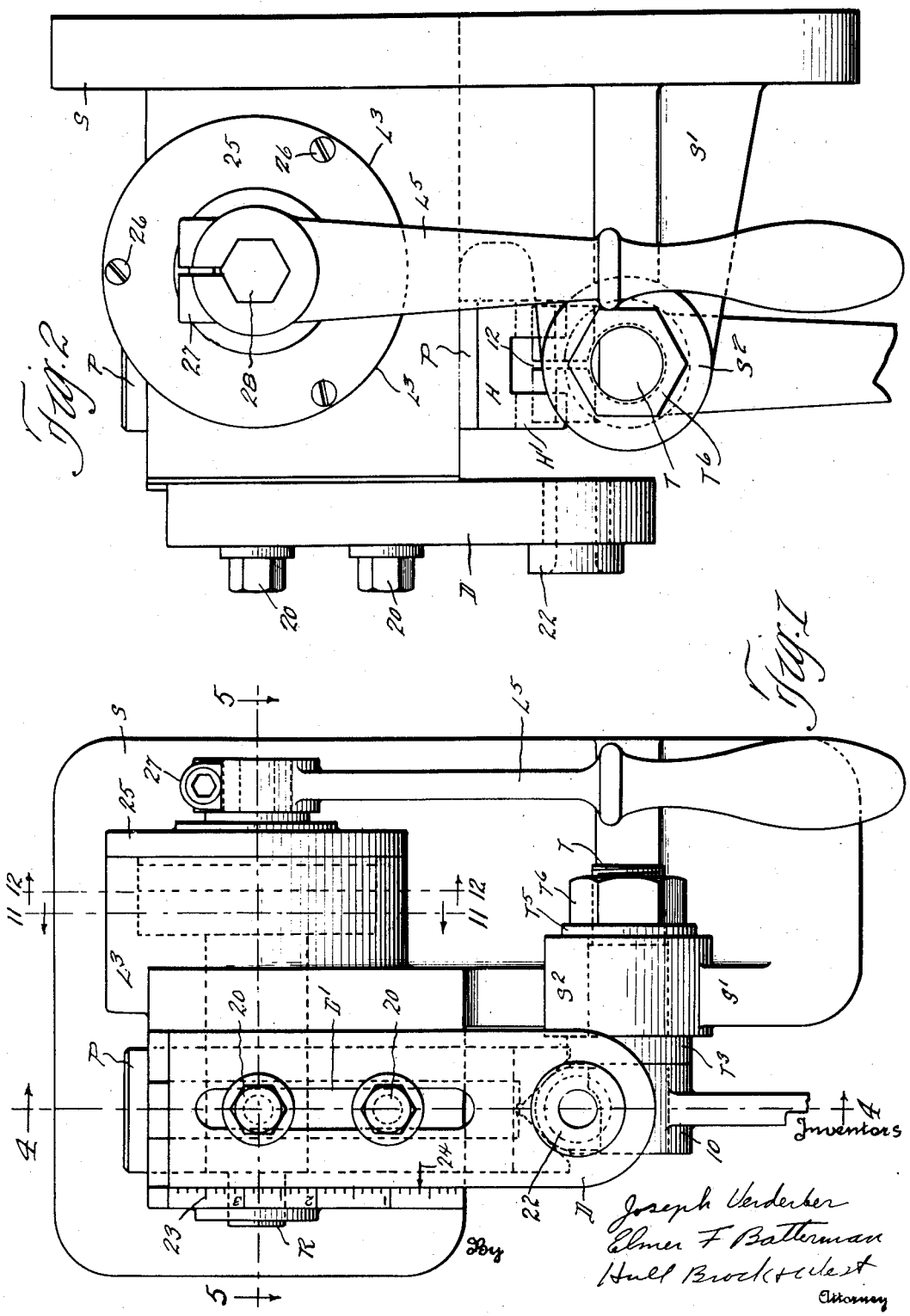

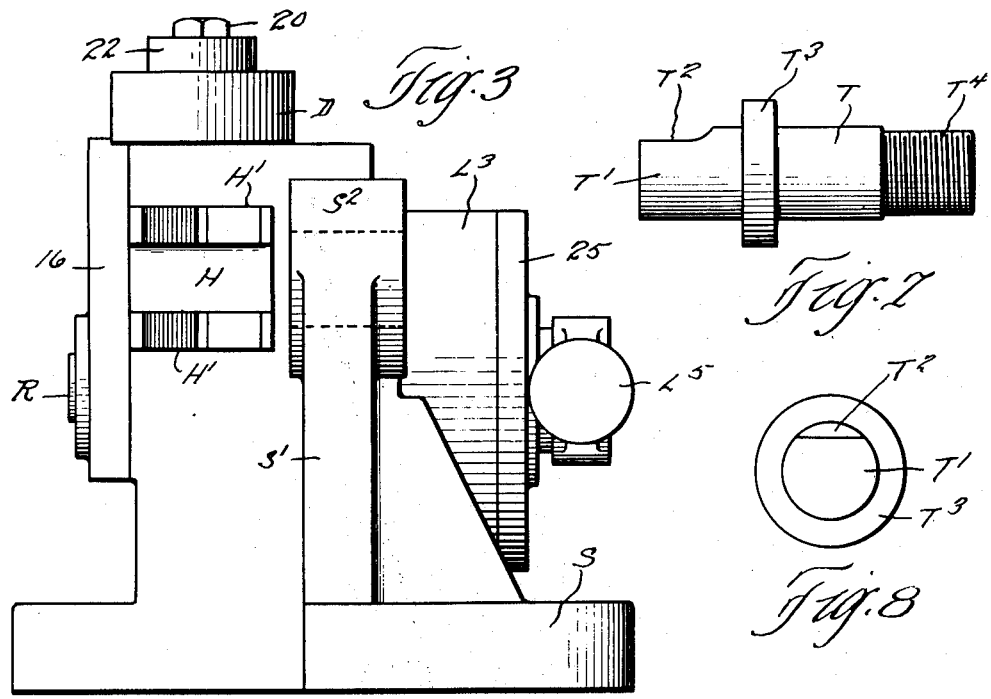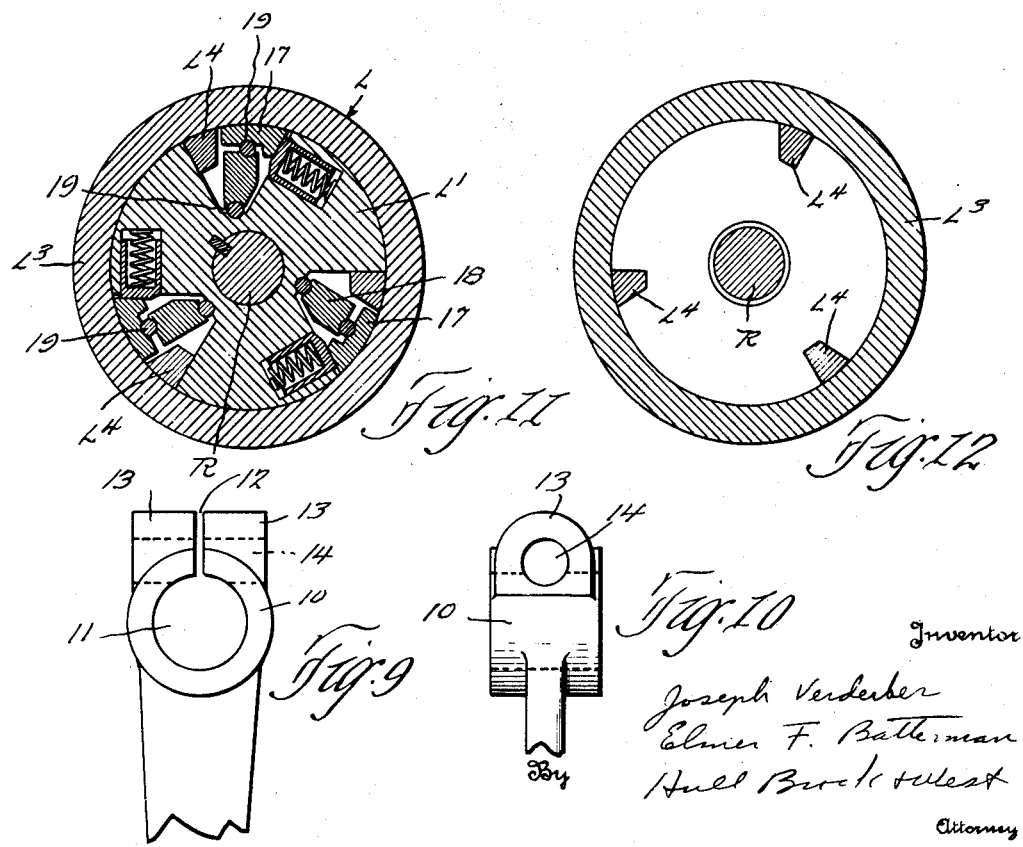

Aug. 8, 1933.   E. F. BATTERMAN ET AL   1,921,721
CLAMP
Filed Feb. 5, 1931   3 Sheets-Sheet 3
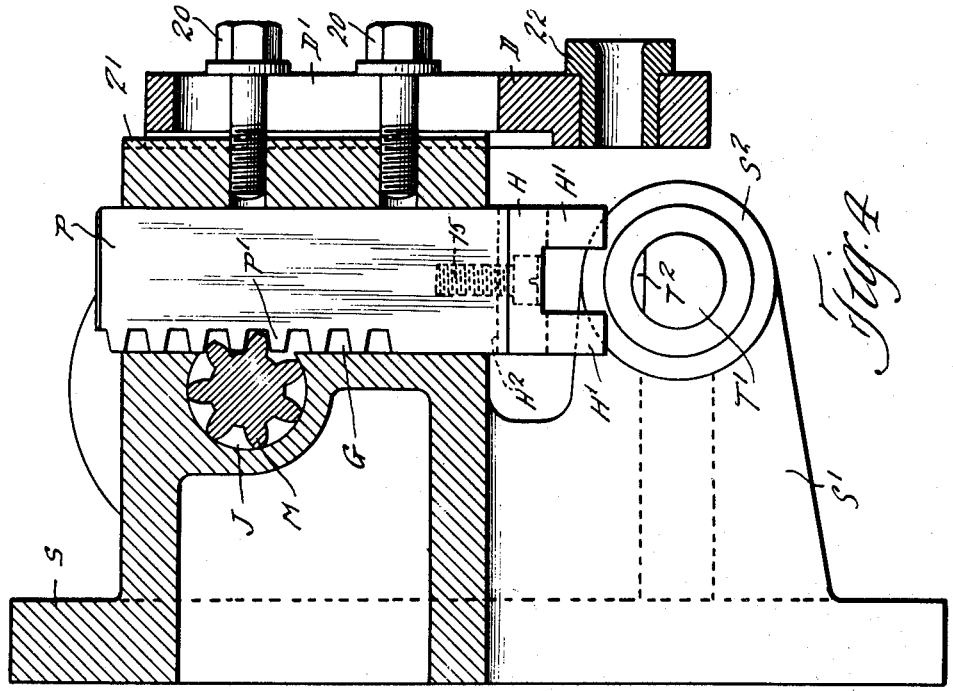
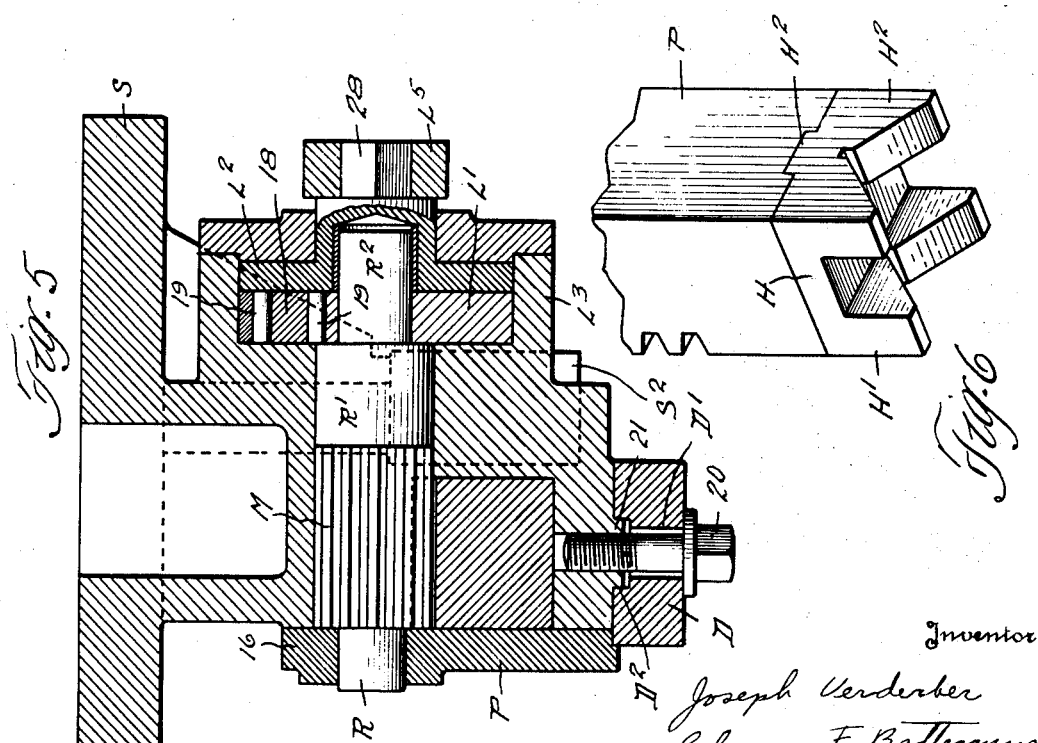
Inventors
Joseph Verderber
Elmer F Batterman
Hull Brock + West
Attorney Patented Aug. 8, 1933

1,921,721

UNITED STATES PATENT OFFICE 1,921,721

CLAMP

Elmer F. Batterman and Joseph Verderber, Cleveland, Ohio, assignors to The Cleveland Universal Jig Company, Cleveland, Ohio, a Corporation of Ohio Application February 5, 1931. Serial No. 513,626

9 Claims. (Cl. 77—62)

This invention relates to a jig for holding split-ring clamps or machine parts having split-ring clamps incorporated therein for the purpose of drilling the same to receive the clamping bolt. The main object of the invention is to provide such a jig which shall be well adapted for its purpose, simple in construction and economical of manufacture. A more specific object is to provide such a jig which will firmly grip the split-ring clamp at both sides of its dividing kerf and enable the clamping bolt hole to be drilled or reamed without danger of binding while assuring that the said hole shall be continuous through the two halves. A further object is the incorporation of a lock in connection with the holding means which engages the split-ring clamp, of such character as to allow the holding means to be advanced into holding position and retracted from such position by the operation of a clamping lever while preventing retrograde motion of the holding member by the force of reaction to the movement of the holding plunger. A further object is the provision of an adjustable drill or reamer guide for assuring proper positioning of the drill or reamer with respect to the clamping bolt hole. Other and more limited objects will become apparent as the specification proceeds.

Fig. 1 is a plan or elevational view, depending upon whether the drill or reamer is to be vertically or horizontally disposed; Fig. 2 is an elevational view; Fig. 3 is an end view; Fig. 4 is a section on line 4—4 of Fig. 1; Fig. 5 is a section on line 5—5 of Fig. 1; Fig. 6 is a fragmentary perspective view of the holding member and a portion of the holding plunger; Fig. 7 is a detail elevation of the split-ring clamp-holding stud; Fig. 8 is an end view of the same; Fig. 9 is a fragmentary end view of a piece of mechanism embodying a split-ring clamp; Fig. 10 is a fragmentary side elevation thereof; Fig. 11 is a sectional view of the locking means corresponding to a section on the line 11—11 of Fig. 1; and Fig. 12 is a section on line 12—12 of Fig. 1.

In Figs. 9 and 10, we have shown a piece of mechanism embodying a split-ring clamp of the type with which this machine is designed to be used. As shown, this clamp includes a ring portion 10 which is adapted to receive a shaft in the opening 11 thereof and which is provided with a dividing kerf 12 and projections 13 through which a clamping bolt is adapted to pass for firmly clamping the ring 10 against a shaft occupying the space 11. A clamping bolt hole 14 is to be formed by a drill operating in conjunction with the embodiment of my present invention. It is to be understood that the clamping bolt hole 14 may be roughly formed prior to this operation and reamed to true shape instead of being drilled.

The embodiment of our invention illustrated includes a main casting or support S having various projections, bearings, guideways and the like formed thereon for mounting the various moving parts in proper operative relation to each other. A portion $S^1$ of the support S carries a holder $S^2$ provided with a central opening adapted to receive a clamped ring-holding stud upon which the clamp ring is received by placing the opening 11 thereof over the end $T^1$ of the stud T. A guide opening G is formed in the body of the casting or support S and receives a plunger P which is provided with a holding member H adapted to engage the split-ring clamp at the two sides of its divided kerf 12 whereby to hold them in firmly fixed position when the plunger is moved toward the stud T. The casting S is also provided with a cylindrical opening J which receives a shaft R which carries a pinion M and a portion $L^1$ of a locking mechanism L in fixed relation thereon. A drill or reamer guide D is adjustably carried by the casting or support S and is slidable with respect thereto.

The stud T includes the clamp receiving portion $T^1$ having a portion cut away as at $T^2$, a collar $T^3$ and a threaded portion $T^4$ adapted to cooperate with the washer $T^5$ and a nut $T^6$ for positioning the same in proper relation to the support S, as clearly indicated in the drawings. The cutaway portion $T^2$ is provided for the purpose of preventing the drill or reamer from engaging the stud T.

The holding member H is provided with a pair of projections $H^1$ each having a V-shaped or notched end portion, said portions being spaced apart for the purpose of engaging the projections 13 of the split-ring clamp at opposite sides of the dividing kerf 12. The detailed construction of this member is clearly indicated in Fig. 6, and its attachment to the holding plunger P by the projection $H^2$ and the stud 15 is clearly indicated in Figs. 4 and 6 taken together. The holding plunger P which carries the holding member H has a working fit in the guiding opening G and has rack teeth $P^1$ formed thereon.

The shaft R includes a portion $R^1$ which acts as a bearing in the support S, a pinion portion M of an external diameter of size equal to the portion $R^1$, a projection $R^2$ adapted to carry the portion L¹ of the lock L and to journal the portion L² of said lock and the small projection at the opposite end from the projection R² adapted to be journaled in the bearing plate 16. The pinion M engages the rack teeth P¹ for the purpose of advancing the holder member H for engagement with the split ring clamp when the shaft R is rotated in the advanced direction.

The locking member L includes a sleeve L³ forming a part of the casting S, or being separate and fixedly attached thereto, as desired, the member L¹ which is keyed on the shaft R and the actuating member L² carrying the projections L⁴ which under impulsion from the lever L⁵ serves to rotate the pinion M in either direction, as well as the locking toggle mechanism comprising the brake shoes 17, blocks 18 and bearing pins 19.

The drill or reamer guide D is comprised of a plate indicated by the numeral D and provided with a slot D¹ and a groove D² adapted to cooperate with studs 20 and the upstanding tongue 21 which forms a portion of the casting S, for securing straight line movement, and is provided with a renewable bushing 22 which is received in an opening at one end thereof and is adapted to be positioned in alignment with those portions of the projections 13 and ring 10 which occupy a position of the clamping bolt hole 14 to be drilled or reamed.

In Fig. 1 we have shown the provision of a scale 23 on a portion of the support S alongside the plate D, which may cooperate with a hair line 24 on the adjusting plate D for the purpose of determining with exactness the position of said adjusting plate.

The operation of the locking mechanism disclosed herein will not be described since this lock is disclosed in a co-pending application and per se forms no part of the present invention.

While we have shown and described the preferred embodiment of our invention, we wish it understood that we are not limited to the details of such embodiment and that our invention is susceptible of numerous variant embodiments within the scope of the appended claims.

Having thus described our invention, what we claim is:

1. A jig for holding split-ring clamps for drilling or reaming the clamping bolt holes including, a support, a stud carried by said support and adapted to receive said split-ring clamp thereon, a holding member adapted to engage said split-ring clamp at both sides of its dividing kerf, and means for urging said holding member into holding engagement with said split-ring clamp and for locking same in such engagement in any position.

2. A jig for holding split-ring clamps for drilling or reaming the clamping bolt holes including, a support, a stud carried by said support and adapted to receive said split-ring clamp thereon, a holding member adapted to engage said split-ring clamp at both sides of its dividing kerf, means for urging said holding member into holding engagement with said split-ring clamp and for locking same in such engagement in any position, and a drill or reamer guide supported on said support and adapted to effect proper relative positioning of said jig and a drill or reamer.

3. A jig for holding split-ring clamps for drilling or reaming the clamping bolt holes including, a support, a stud carried by said support and adapted to receive said split-ring clamp thereon, a holding member adapted to engage said split-ring clamp at both sides of its dividing kerf, and means for urging said holding member into holding engagement with said split-ring clamp and for locking same in such engagement, said holding member being provided with a pair of spaced notched projections each adapted for engaging said split-ring clamp at one side of its dividing kerf.

4. A jig for holding split-ring clamps for drilling or reaming the clamping bolt holes including, a support, a stud carried by said support and adapted to receive said split-ring clamp, a holding member adapted to engage said split-ring clamp, when held by said stud at both sides of its dividing kerf, means for urging said holding member into holding engagement with said split-ring clamp and for locking same in such engagement, and a drill or reamer guide supported on said support and adapted to effect proper relative positioning of said jig and a drill or reamer, said holding member being provided with a pair of spaced notched projections each adapted for engaging said split-ring clamp at one side of its dividing kerf.

5. A jig for holding split-ring clamps for drilling or reaming the clamping bolt holes including, a support, a stud carried by said support and adapted to receive said split-ring clamp, a holding member adapted to engage said split-ring clamp, when held by said stud at both sides of its dividing kerf, and means for urging said holding member into holding engagement with said split-ring clamp and for locking said member in such engagement, said stud being removable.

6. A jig for holding split-ring clamps for drilling or reaming the clamping bolt holes including, a support, a stud carried by said support and adapted to receive said split-ring clamp, a holding member adapted to engage said split-ring clamp, when held by said stud at both sides of its dividing kerf, and means for urging said holding member into holding engagement with said split-ring clamp and for locking same in such engagement, said stud having a portion cut away to clear the path of said drill or reamer.

7. A jig for holding split-ring clamps for drilling or reaming the clamping bolt holes including, a support, a stud carried by said support and adapted to receive said split-ring clamp, a holding member adapted to engage said split-ring clamp, when held by said stud at both sides of its dividing kerf, means for urging said holding member into holding engagement with said split-ring clamp and for locking same in such engagement, and a drill or reamer guide supported on said support and adapted to effect proper relative positioning of said jig and a drill or reamer, said drill or reamer guide being adjustable.

8. A jig for holding split-ring clamps for drilling or reaming the clamping bolt holes including, a support, a stud carried by said support and adapted to receive said split-ring clamp, a holding member adapted to engage said split-ring clamp, when held by said stud at both sides of its dividing kerf, means for urging said holding member into holding engagement with said split-ring clamp and for locking same in such engagement, and a drill or reamer guide supported on said support and adapted to effect proper relative positioning of said jig and a drill or reamer, said drill or reamer guide being adjustable and including a renewable bushing for engagement with the drill or reamer.

9. A jig for holding split-ring clamps for drilling or reaming the clamping bolt holes including, a support, a stud carried by said support and adapted to receive said split-ring clamp, a holding member adapted to engage said split-ring clamp, when held by said stud at both sides of its dividing kerf, and means for urging said holding member into holding engagement with said split-ring clamp and for locking same in such engagement, said means including a reciprocable plunger having rack teeth thereon, a shaft, a pinion on said shaft and meshing with said rack teeth, and a lock having a portion fixed on said shaft, a portion fixed on said support and an actuating handle, said lock allowing said shaft to be actuated in both directions by said handle but preventing withdrawal from holding position except by movement of said handle.

ELMER F. BATTERMAN.
JOS. VERDERBER.